United States Patent
Turse et al.

(10) Patent No.: US 10,071,823 B2
(45) Date of Patent: Sep. 11, 2018

(54) EXTENDIBLE BOOM

(71) Applicant: Composite Technology Development, Inc., Lafayette, CO (US)

(72) Inventors: Dana Turse, Broomfield, CO (US); Robert Taylor, Superior, CO (US); Larry G. Adams, Thornton, CO (US); Doug Richardson, Westminster, CO (US)

(73) Assignee: COMPOSITE TECHNOLOGY DEPARTMENT, INC., Lafayette, CO (US)

( * ) Notice: Subject to any disclaimer, the term of this patent is extended or adjusted under 35 U.S.C. 154(b) by 122 days.

(21) Appl. No.: 14/555,265

(22) Filed: Nov. 26, 2014

(65) Prior Publication Data

US 2015/0144740 A1   May 28, 2015

Related U.S. Application Data

(60) Provisional application No. 61/909,921, filed on Nov. 27, 2013.

(51) Int. Cl.
    *E04H 12/18*   (2006.01)
    *B64G 1/22*    (2006.01)
    *B64G 1/44*    (2006.01)

(52) U.S. Cl.
    CPC .............. *B64G 1/222* (2013.01); *B64G 1/44* (2013.01); *B64G 1/443* (2013.01)

(58) Field of Classification Search
    CPC ................................ E04C 3/005; H01Q 1/087
    See application file for complete search history.

(56) References Cited

U.S. PATENT DOCUMENTS

| | | | | |
|---|---|---|---|---|
| 3,252,173 | A | * | 5/1966 | Robinsky ................ E01D 15/20 14/2.4 |
| 3,385,397 | A | * | 5/1968 | Robinsky .............. E04H 12/185 182/41 |
| 4,265,690 | A | * | 5/1981 | Lowenhar ................. H01P 3/00 156/148 |
| 6,904,722 | B2 | * | 6/2005 | Brown .................. B64G 1/222 52/108 |

* cited by examiner

Primary Examiner — Patrick J Maestri
(74) Attorney, Agent, or Firm — Sanders IP Law

(57) ABSTRACT

An asymmetric mast is disclosed that can be used for solar arrays. The asymmetric mast can have an asymmetry out of the plane of the solar blanket. The mast may include two or more booms that comprise slit tube longerons. In some embodiments, a single mast can be used with one or two solar blankets.

7 Claims, 13 Drawing Sheets

EXTENDIBLE BOOM

CROSS REFERENCE

This application is a non-provisional of and claims priority to U.S. Patent Application No. 61/909,921, filed Nov. 27, 2013, titled STABLE TUBULAR EXTENDIBLE LOCKING COMPOSITE BOOM.

GOVERNMENT RIGHTS

This invention was made with government support under contract number NNX14CL11C awarded by the National Aeronautics and Space Administration (NASA) and under contract number NNX13C31P awarded by the National Aeronautics and Space Administration (NASA). The government has certain rights in the invention.

BACKGROUND

Lightweight, strong and deployable solar arrays can be useful for satellite and space vehicle use. Often solar arrays are deployed using a number of techniques and/or structures that often employ such things as booms, masts, and/or solar blankets. These solar arrays can be stowed during liftoff and deployed when in orbit.

SUMMARY

Embodiments described herein include an extendible solar array having a stowed configuration and a deployed configuration. The extendible solar array may include a mast that includes a first slit tube longeron having a first longitudinal length; and a second slit tube longeron having a second longitudinal length that is coupled longitudinally along the second longitudinal length with the first slit tube longeron along the first longitudinal length. In some embodiments, the mast may include a lateral mast axis that is substantially perpendicular to the first slit tube longeron and the second slit tube longeron. The extendible solar array may include a solar blanket having a planar shape in the deployed configuration, the solar blanket coupled with the mast along an axis substantially perpendicular to the lateral mast axis.

In some embodiments, the first slit tube longeron and the second slit tube longeron are substantially parallel in the deployed configuration. In some embodiments, the first slit tube longeron and the second slit tube longeron are parallel with the solar blanket. In some embodiments, the mast provides asymmetric bending stiffness out of the plane of the solar blanket.

In some embodiments, the mast further comprises an attachment mechanism that couples one end of the first slit tube longeron with one end of the second slit tube longeron. In some embodiments, the mast further comprises one or more shear ties that couple the first slit tube longeron and the second slit tube longeron together. In some embodiments, the mast further comprises one or more rigid battens that couple the first slit tube longeron and the second slit tube longeron together.

Embodiments described herein include a mast that includes at least two slit tube longerons. In some embodiments, a first slit tube longeron may have a first longitudinal axis and a first slit that extends along a length of the first longitudinal axis. In some embodiments, a second slit tube longeron may have a second longitudinal axis and a second slit that extends along a length of the second longitudinal axis. A coupling mechanism may couple the first slit tube longeron with the second slit tube longeron. In a stowed configuration the first slit tube longeron is flattened and rolled along the first longitudinal axis and the second slit tube longeron is flattened and rolled along the second longitudinal axis. In a deployed configuration the first slit tube longeron may be extended along the first longitudinal axis and the second slit tube longeron is extended along the second longitudinal axis. The first longitudinal axis and the second longitudinal axis may be substantially parallel.

In some embodiments, the coupling mechanism may be attached to one end of the first slit tube longeron and one end of the second slit tube longeron. In some embodiments, the coupling mechanism may include one or more shear ties coupled with a plurality of locations on the first slit tube longeron and coupled with a plurality of locations on the second slit tube longeron. In some embodiments, the mast may include a plurality of rigid battens, each batten of the plurality of rigid battens may be coupled with both the first slit tube longeron and the second slit tube longeron.

In some embodiments, the first slit tube longeron and the second slit tube longeron are disposed relative to each other such that the first slit and the second slit are facing. In some embodiments, the first slit tube longeron and the second slit tube longeron are disposed relative to each other such that the first slit and the second slit face away. In some embodiments, the first slit tube longeron and the second slit tube longeron are disposed relative to each other such that the first slit and the second slit face the same direction.

Embodiments described herein include an extendible solar array having a stowed configuration and a deployed configuration. The extendible solar array may include a mast having a first slit tube longeron having a slit extend along a first longitudinal axis in the deployed configuration; and a second slit tube longeron having a slit extend along a second longitudinal axis in the deployed configuration, wherein the first longitudinal axis and the second longitudinal axis are parallel. The extendible solar array may also include a solar blanket having a planar shape in the deployed configuration, the solar blanket coupled with the mast along an axis substantially parallel to the first longitudinal axis.

In some embodiments, the mast may include an attachment mechanism that couples one end of the first slit tube longeron with one end of the second slit tube longeron. In some embodiments, the mast may include one or more shear ties that couple the first slit tube longeron and the second slit tube longeron. In some embodiments, the mast may include one or more rigid battens that couple the first slit tube longeron and the second slit tube longeron together.

BRIEF DESCRIPTION OF THE FIGURES

These and other features, aspects, and advantages of the present disclosure are better understood when the following Detailed Description is read with reference to the accompanying drawings.

DETAILED DESCRIPTION

An asymmetric mast is disclosed. In space applications, a solar blanket can be flexible blanket with a plurality of solar cells that extends from the body of a satellite (or other space vehicle). Often a space blanket can be stored in a stowed configuration during launch or other activities. In the stowed configuration the solar blanked can be rolled and secured in a housing coupled within, on, or near the satellite. The solar blanket can be deployed into a substantially flat surface to collect solar energy. Any number of techniques can be used to deploy a space blanket from the stowed configuration.

Figure 1A:
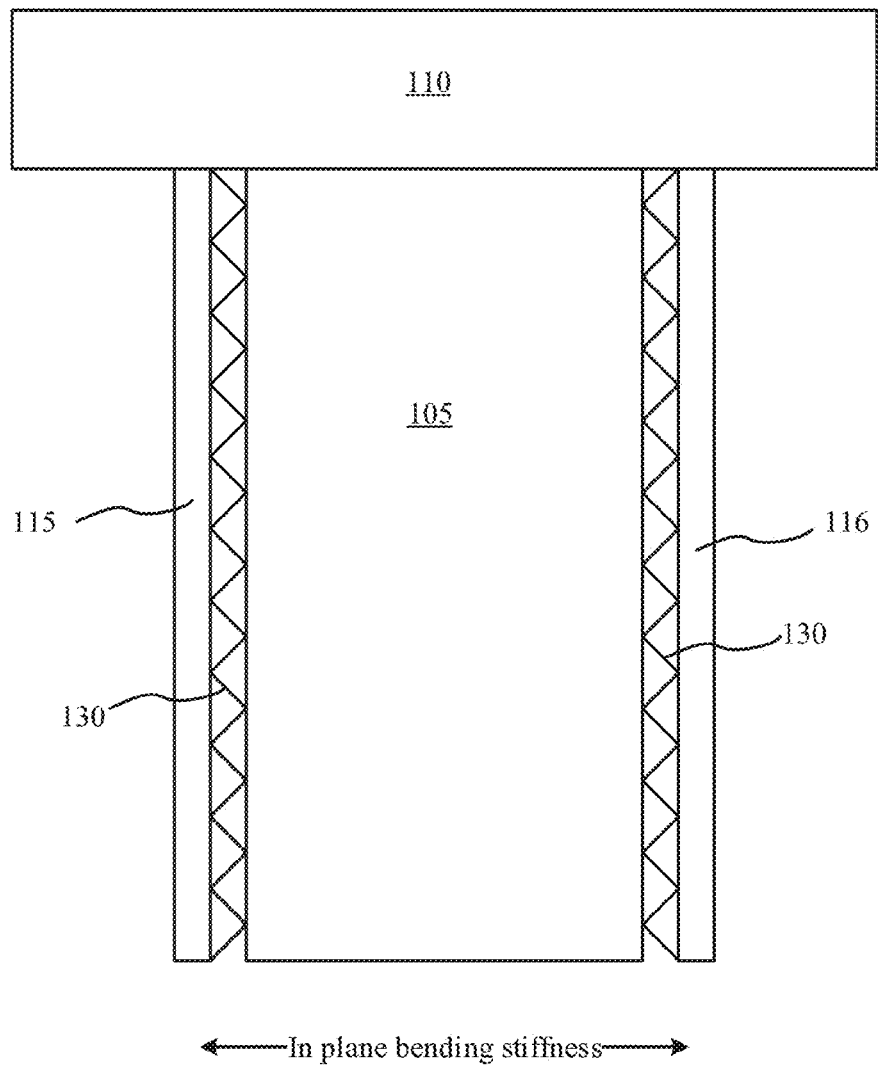
FIG. 1A is a top view of a solar blanket coupled with two masts according to some embodiments of the invention.
Figure 1B:
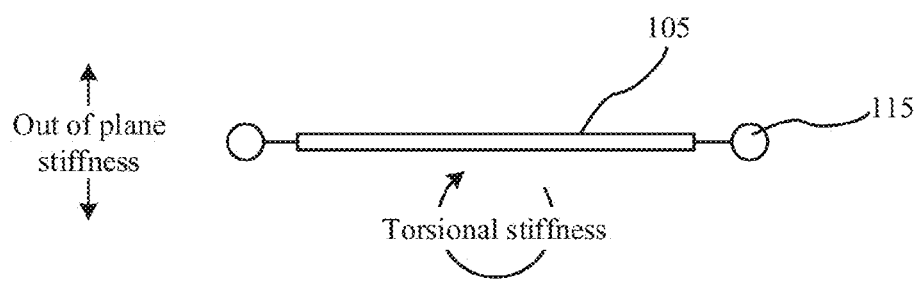
FIG. 1B is an end view of a solar blanket coupled with two masts according to some embodiments of the invention.

Once deployed, tension in the space blanket can have a dominant influence on the torsional stiffness in the solar blanket, and tension in the space blanket can also have a dominant influence on in-plane bending stiffness. For instance, in FIG. 1A, which shows the top view of a deployed solar blanket (or extendible solar array), a solar blanket 105 is deployed from a satellite 110 using two masts 115 and 116. A graphical view of the in-plane bending stiffness provided by the tension in the solar blanket 105 is shown. In FIG. 1B, which shows an end view of the solar blanket 105 in a deployed state, a graphical representation of the torsional stiffness provided by the tension in solar blanket 105 is shown.

The solar blanket 105 can include a thin flexible sheet of material and a plurality of solar cells. These solar cells can capture and convert sunlight into electrical power for consumption with the satellite 110. The solar blanket may have a substantially planar shape.

Tension in the solar blanket 105, however, does not provide much influence on out-of-plane stiffness, which is graphically shown in FIG. 1B. Some embodiments are directed toward an asymmetric mast that may provide out of plane bending stiffness and/or torsional stiffness. In some embodiments, the mast can have an asymmetry in the y-axis direction (e.g., a direction perpendicular with the plane of the solar blanket) when viewing the mast from the end of the mast, based on x-y axis 135. For example, the mast can provide more or the same stiffness or resistance to bending in the y-axis than in the x-axis. One or more shear ties 130, for example, can be used to coupled and/or tension the solar blanket 105 between the two masts. Various other attachment mechanisms may be used to attach the solar blanket to the masts.

Figure 2A:
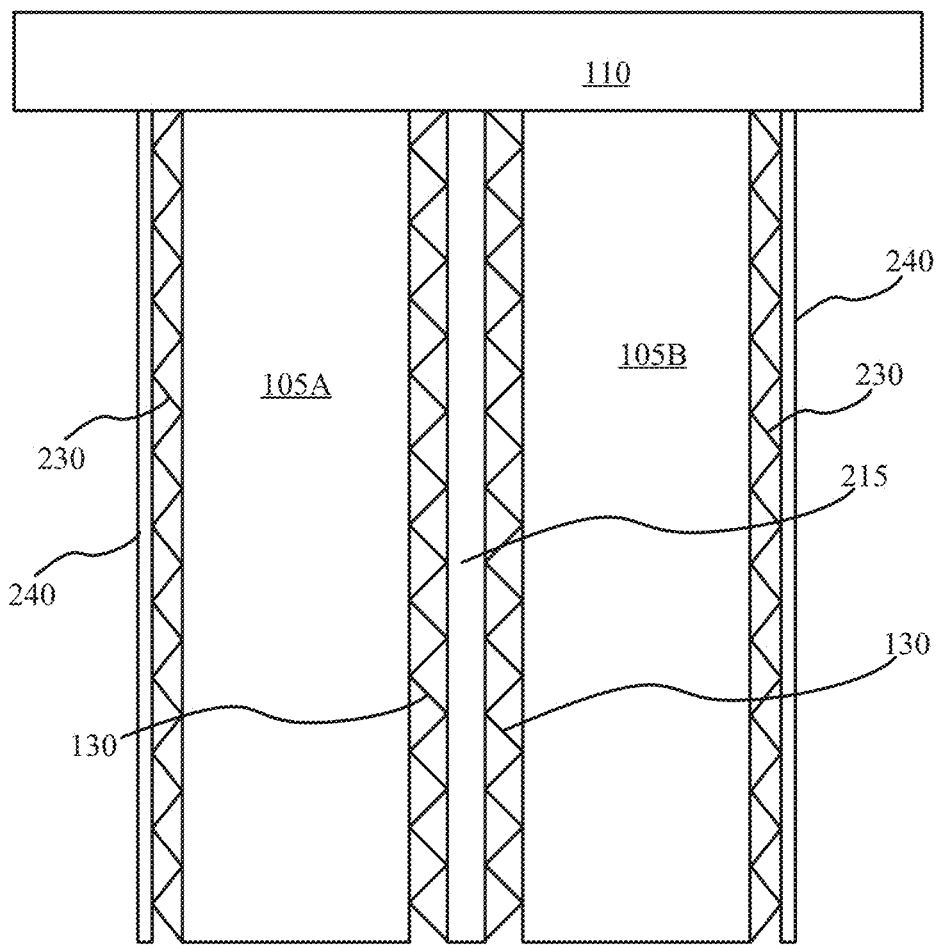
FIG. 2A is a top view of a solar blanket coupled with a single mast according to some embodiments of the invention.
Figure 2B:
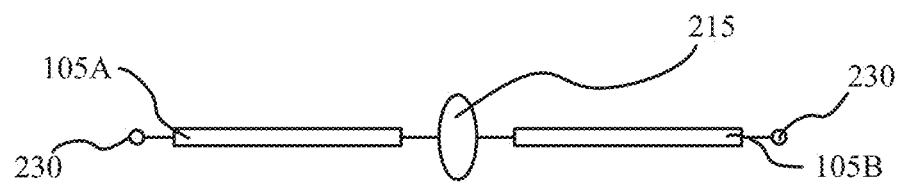
FIG. 2B shows an end view of an asymmetric mast coupled with two solar blankets according to some embodiments of the invention.

In some embodiments, one or more asymmetric masts can be used to provide the proper out of plane bending stiffness. For example, a single, asymmetric mast 215 can be used as shown in FIG. 2A. Two solar blankets 105A and 105B can be coupled with asymmetric mast 215 and two other asymmetric masts 230. One or more shear ties 130, for example, can be used to tension the solar blanket 105 with the asymmetric mast 215. FIG. 2B shows an end view of the asymmetric mast 215, which has an asymmetry in the y-axis relative to the solar blanket. One or more external cords 240, for example, can be used to provide additional tension within solar blanket 105. Various other techniques may be used to tension the solar blanket. In some embodiments, asymmetric mast 215 can provide out of plane tension.

Figure 2C:
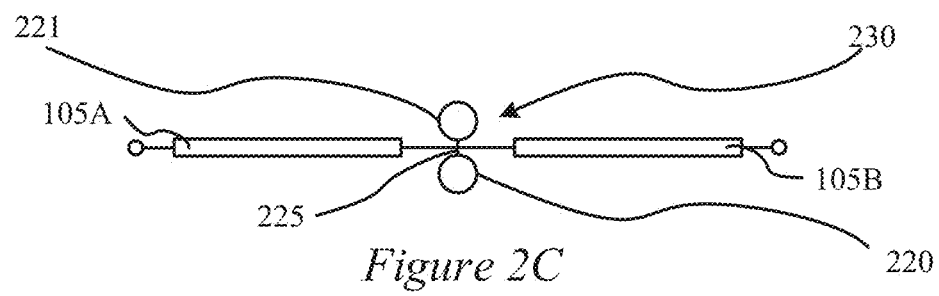
FIG. 2C shows an end view of a two boom mast coupled with two solar blankets according to some embodiments of the invention.

FIG. 2C shows an end view of an asymmetric mast 230 according to some embodiments of the invention. The two booms 220 and 221 may be asymmetrically aligned perpendicular with respect to the plane of the solar blankets 105A and 105B. One or more shear ties 225 can couple the booms 220 and 221 together. The asymmetric mast 230 can provide out of plane tension. In some embodiments, a single out of plane mast or boom can be used.

Figure 2D:
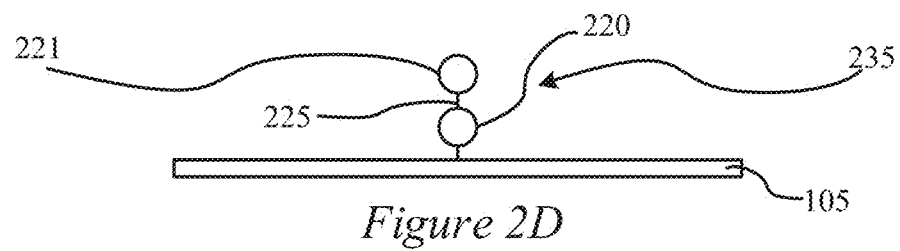
FIG. 2D shows an end view of an out of plane, two boom mast coupled with two solar blankets according to some embodiments of the invention.

FIG. 2D shows an end view of an out of plane, two boom asymmetric mast 235 according to some embodiments of the invention. The mast 235 may include two booms 220 and 221 that are asymmetrically aligned above (or, alternatively, below) the solar blanket 105 plane. One or more shear ties 225 can connect the booms 220 and 221 together. The mast 235 can provide out of plane tension. In some embodiments, a single out of plane mast or boom can be used.

In some embodiments, the booms may comprise one or more longerons. As discussed herein, longerons can include any elongated tubular material. Longerons can have a cross-sectional profile comprising all or a portion of a circle, ellipse, curved, or polygonal shape. Moreover, a slit-tube longeron can include a slit along the longitudinal length of the slit-tube longeron. The slit can include a straight slit, curved, and/or jagged slit along the longitudinal length of the slit-tube longeron. In some embodiments, the slit can allow portions of the longeron to overlap or have a wide slit; the latter comprising a fractional tube longeron such that a cross section of the longeron comprises an open shape.

Slit-tube longerons can have two configurations. A first configuration can include a stowed configuration. A second configuration can include a deployed configuration. In the stowed configuration the slit-tube longeron can flatten laterally and be rolled longitudinally. In the deployed configuration the slit-tube longeron can be extended longitudinally and rolled or curved laterally. In some embodiments, a slit-tube longeron can be stable in both the first and second configurations.

In some embodiments, slit-tube longerons can have a single rest state. That is, the slit-tube longeron can have a single stable state. For example, the deployed state can be stable and the stowed state unstable. Thus, in the stowed state the slit-tube longeron may need to be constrained in order to maintain the slit tube longeron in the stowed state. Once the constraints are released, the slit tube longeron may extend into the deployed state.

In some embodiments, a slit-tube longeron can have multiple rest states. Such slit-tube longerons can be in a rest state at some point between the rolled and extended shape. Moreover, various other types of resting states can exist.

Figure 3:
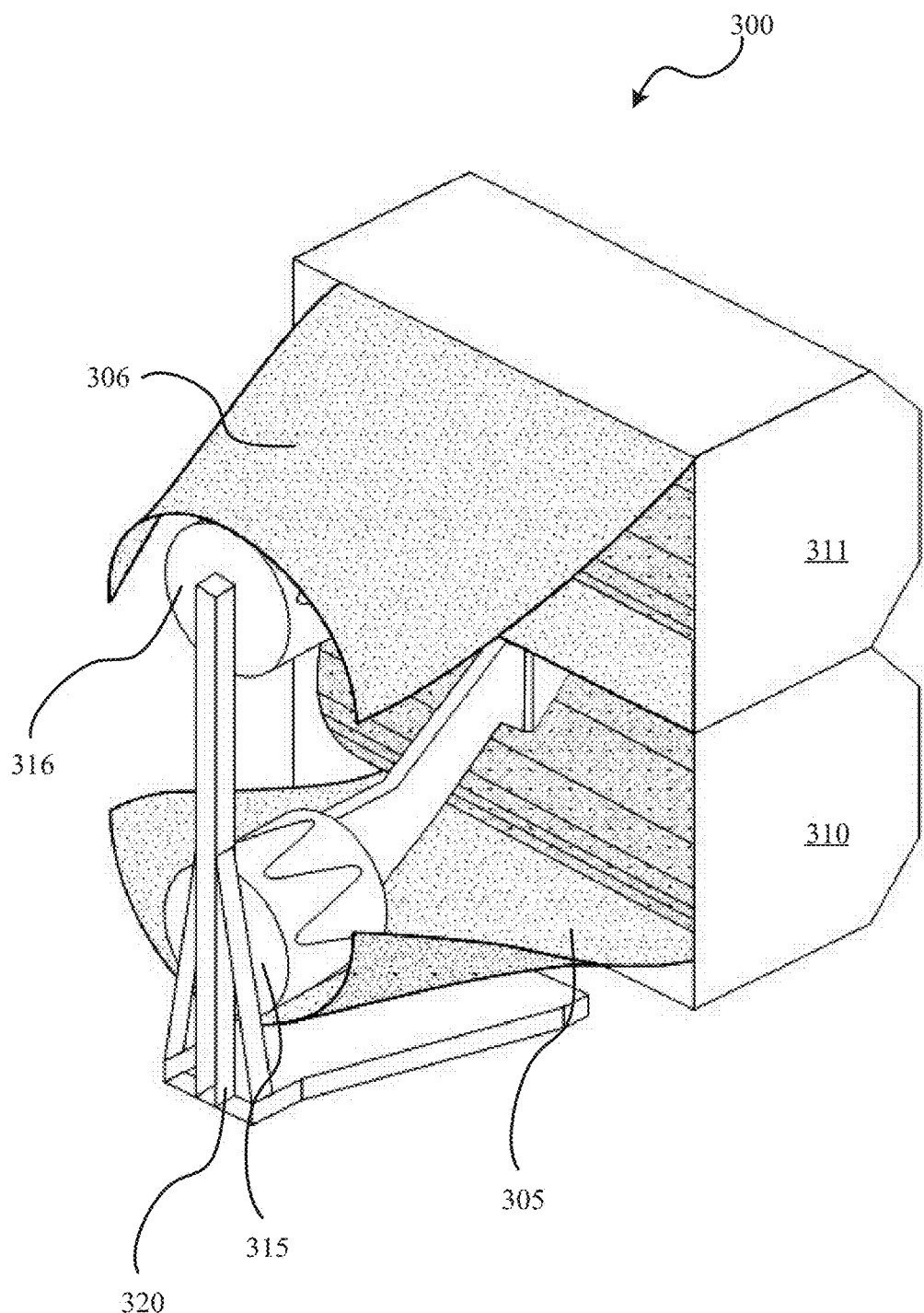
FIG. 3 illustrates a mast in a stowed configuration according to some embodiments described herein.

FIG. 3 illustrates a mast 300 in the stowed configuration according to some embodiments described herein. The mast may include boom 305 and boom 306. Each of the booms 305 and 306 may include a slit tube longeron. In FIG. 3, the boom 305 and the boom 306 are in a stowed configuration and are flattened along their lateral axis and rolled along their longitudinal axis. The boom 305 is stowed in housing 310 and the boom 306 is stowed in housing 311. In some embodiments, the boom 305 and the boom 306 may be stowed within a single combined housing. The boom 305 may include an endcap 315 disposed at the longitudinal end of the boom 305 and the boom 306 may include an endcap 316 disposed at the longitudinal end of the boom 306. The endcap 315 and the endcap 316 may be coupled together with an attachment mechanism 320 (or bracket). In some embodiments, the attachment mechanism 320 may couple with the endcap 315 and/or the endcap 316 in a pinned connection that allows the endcap 315 to rotate relative to endcap 316 and/or allows the endcap 316 to rotate relative to endcap 315. In some embodiments, the endcap 315 and endcap 316 may be coupled rigidly.

When the boom 305 and the boom 306 are deployed the slits in the respective longerons may be disposed so the slits face each one another.

In some embodiments, at least one dimension of the housing 310 and/or housing 311 with the booms 305 and 306 stowed within may be less than 1.0, 0.7, 0.5, 0.4, 0.3, 0.2, or 0.1 meters. In some embodiments, the housing may include a spindle around which the boom 305 and the boom 306 may be rolled when in the stowed configuration. The housing might also include a motor that may be used to roll and/or unroll either or both boom 305 or boom 306.

In some embodiments, for example, as shown in FIG. 3 and in various other figures, the boom 305 and the boom 306 may be parallel or substantially parallel along the longitudinal length of the booms. The boom 305 and the boom 306 may form a lateral mast axis, which in FIG. 3 is vertical. The lateral mast axis may be defined by the center of the cross section of the boom 305 and the center of the cross section of the boom 306. The lateral mast axis may be substantially perpendicular with the plane of the solar blanket 105.

Figure 4:
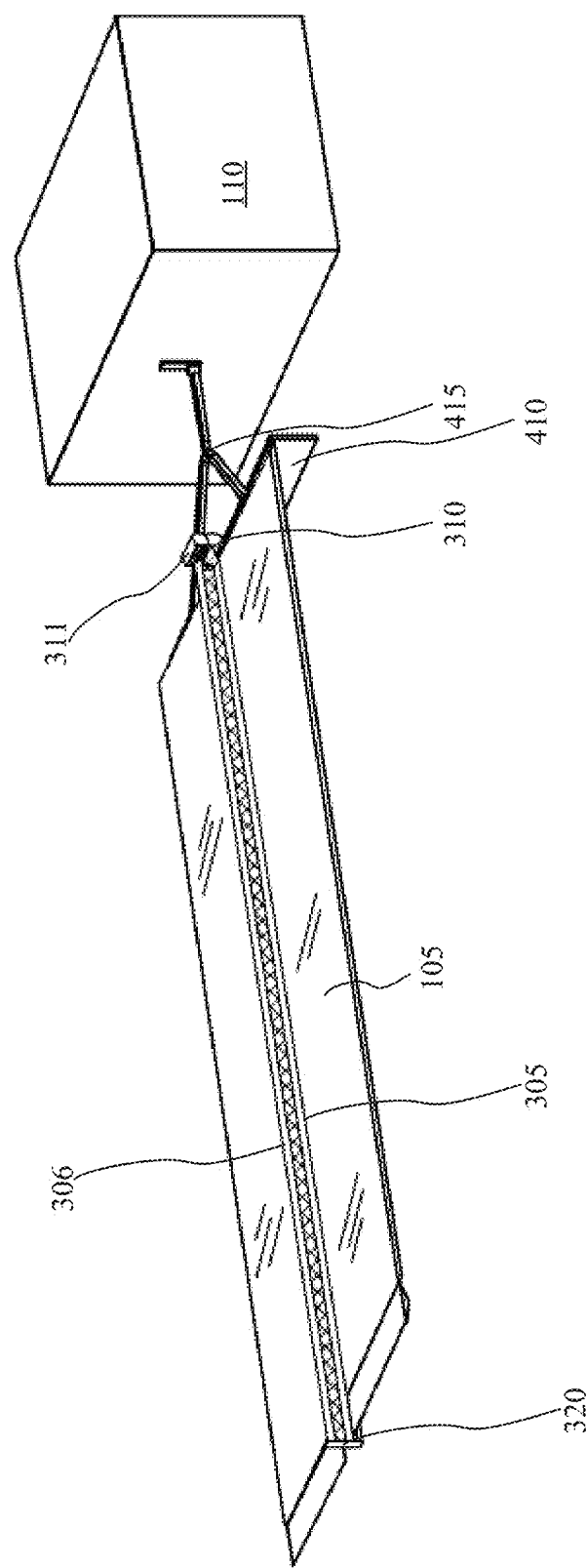
FIG. 4 illustrates a mast in an out of plane deployed configuration with a solar blanket according to some embodiments described herein.

FIG. 4 illustrates the mast 300 in an out of plane deployed configuration with the solar blanket 105 according to some embodiments described herein. As shown in FIG. 4, the mast is not in plane or centered in plane with the solar blanket 105. For example, boom 305 and boom 306 are disposed on the same side of the solar blanket and have a lateral axis that is perpendicular with a plane of the solar blanket.

The solar blanket 105 may be stored within a solar blanket housing 415. The housing 310, the housing 311, and the housing 415 may be coupled with the satellite 110 with a yoke structure 410. As shown in the figure, the mast 300 is positioned out of plane relative with the solar blanket 105.

In some embodiments, the solar blanket may be rolled, folded, z-folded, compressed, etc. when in the stowed configuration.

Figure 5:
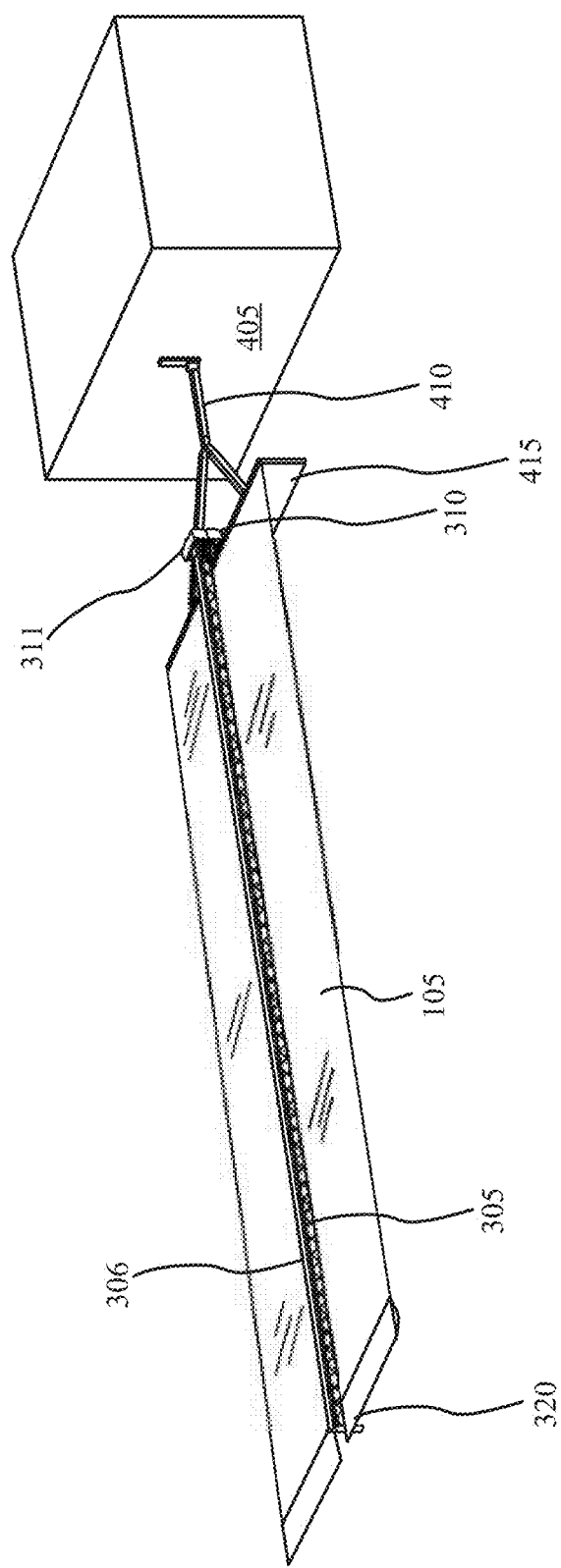
FIG. 5 illustrates a mast in an in-plane deployed configuration with two solar blankets according to some embodiments described herein.

FIG. 5 illustrates the mast 300 in an in-plane deployed configuration with two solar blankets 105A and 105B according to some embodiments described herein. As shown in FIG. 5, the mast is disposed in-plane (e.g., centered in-plane) with the solar blanket 105. For example, the boom 305 is disposed on one side of the solar blanket 105 and the boom 306 are disposed on the same side of the solar blanket and have a lateral axis that is perpendicular with a plane of the solar blanket.

Figure 6:
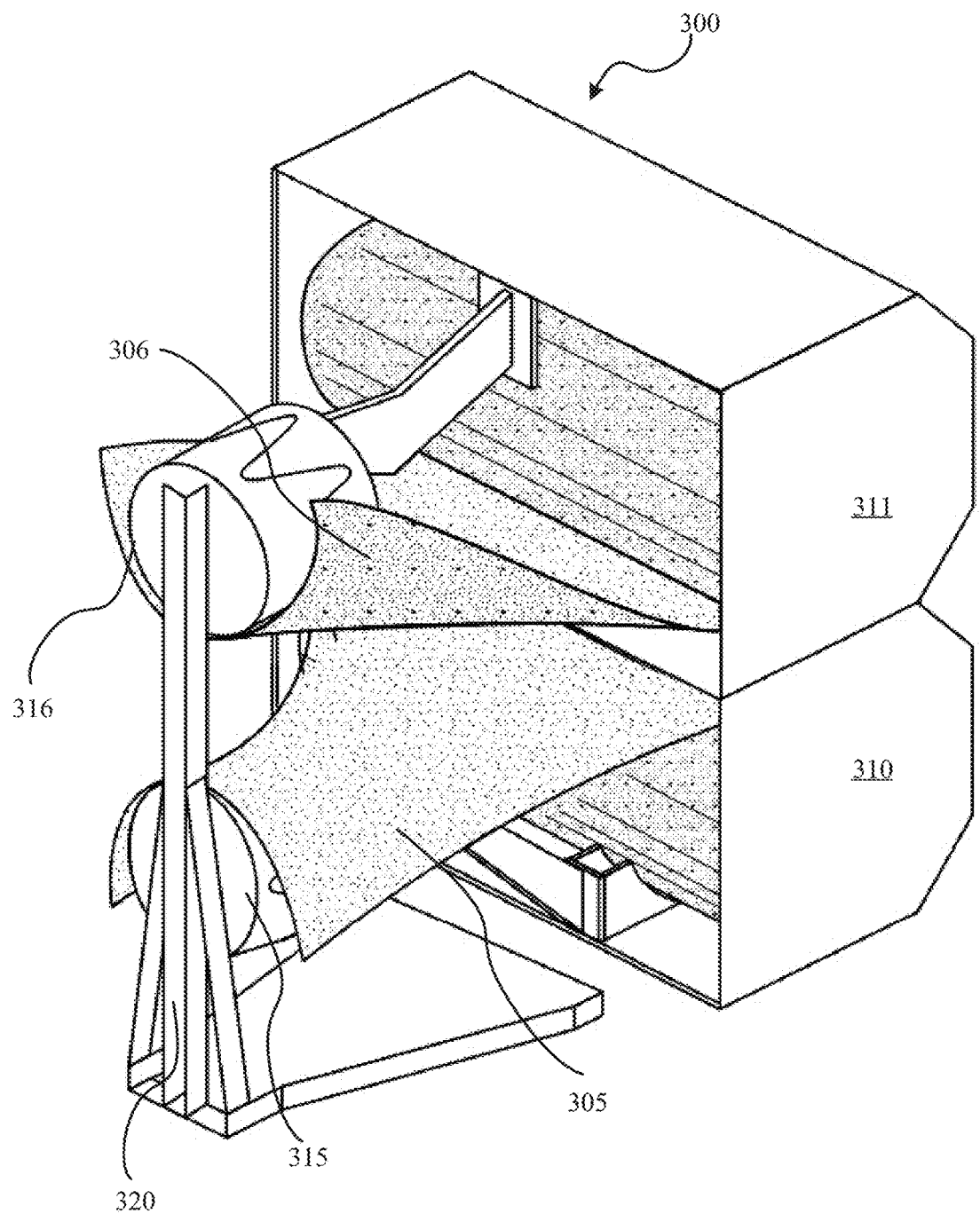
FIG. 6 illustrates another mast in the stowed configuration according to some embodiments described herein.

FIG. 6 illustrates another mast 600 in the stowed configuration according to some embodiments described herein. The mast may include boom 305 and boom 306. Each of the booms 305 and 306 may include a slit tube longeron. The booms 305 and 306 are in a stowed configuration and are flattened along their lateral axis and rolled along their longitudinal axis. The boom 305 is stowed in the housing 310 and the boom 306 is stowed in the housing 311. In some embodiments, the boom 305 and the boom 306 can be stowed within a common housing. The boom 305 may include an endcap 315 disposed at the longitudinal end of the boom 305 and the boom 306 may include an endcap 316 disposed at the longitudinal end of the boom 306. The endcap 315 and the endcap 316 may be coupled together with an attachment mechanism 320. In some embodiments, the attachment mechanism 320 may couple with the endcap 315 and/or the endcap 316 in a pinned connection that allows the endcap 315 to rotate relative to endcap 316 and/or allows the endcap 316 to rotate relative to endcap 315. In some embodiments, the endcap 315 and endcap 316 may be coupled rigidly.

In some embodiments, when the boom 305 and the boom 306 are deployed the slits in the respective longerons may be disposed so they face the opposite directions relative to one another. In some embodiments, when the boom 305 and the boom 306 are deployed the slits in the respective longerons may be disposed so they face each one another. In some embodiments, when the boom 305 and the boom 306 are deployed the slits in the respective longerons may be disposed so they face the same direction.

In some embodiments, one or more shear ties 605 can be used to couple the boom 305 with the boom 306. As used throughout this disclosure, a shear tie may include one or more shear webs, a cord (e.g., a Kevlar cord), a rigid member, or some combination thereof. In some embodiments, the one or more shear ties 605 may be coupled with the boom 305 and/or the boom 306 during deployment. The one or more shear ties 605 may be slackened during deployment and then tightened when deployed.

Figure 7:
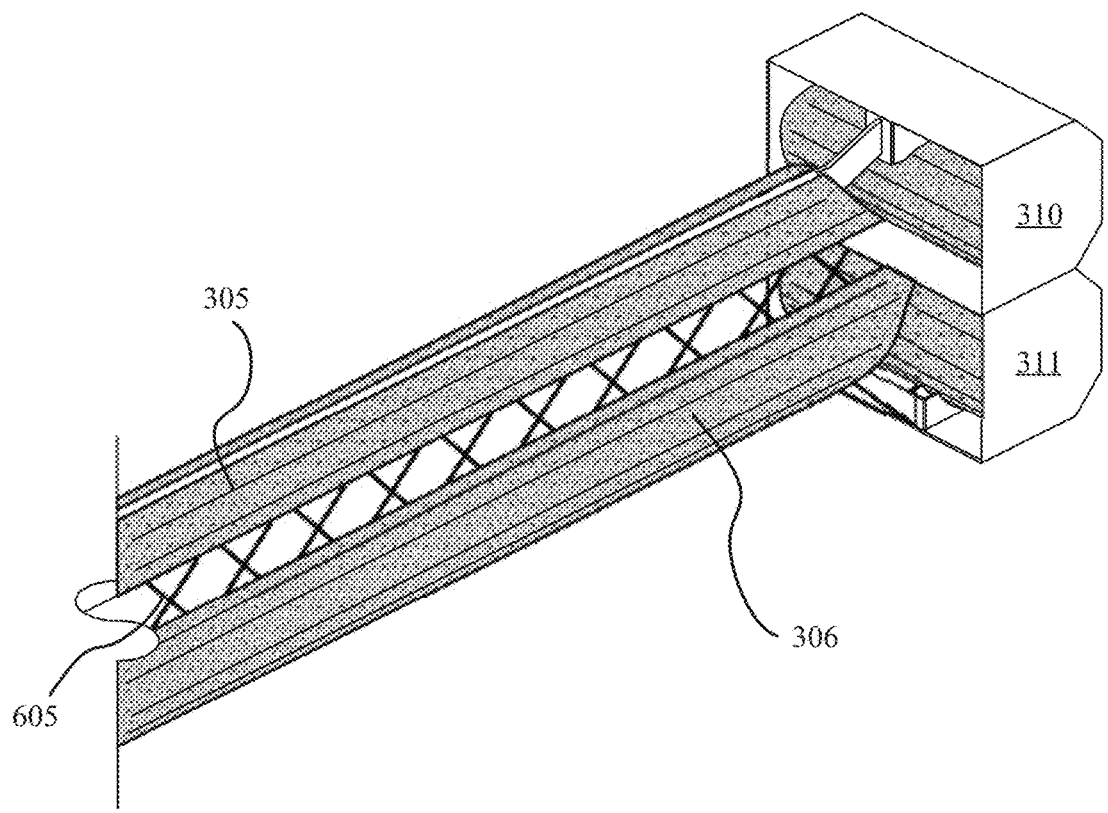
FIG. 7 illustrates a mast in a deployed configuration according to some embodiments described herein.

FIG. 7 illustrates the mast 600 in a deployed configuration according to some embodiments described herein. The one or more shear ties 605 may include crossing patterns of shear ties that extend between the boom 305 and the boom 306 to couple the two booms together, for example, to reduce shear compliance without the two booms being in physical contact with each other.

Figure 8:
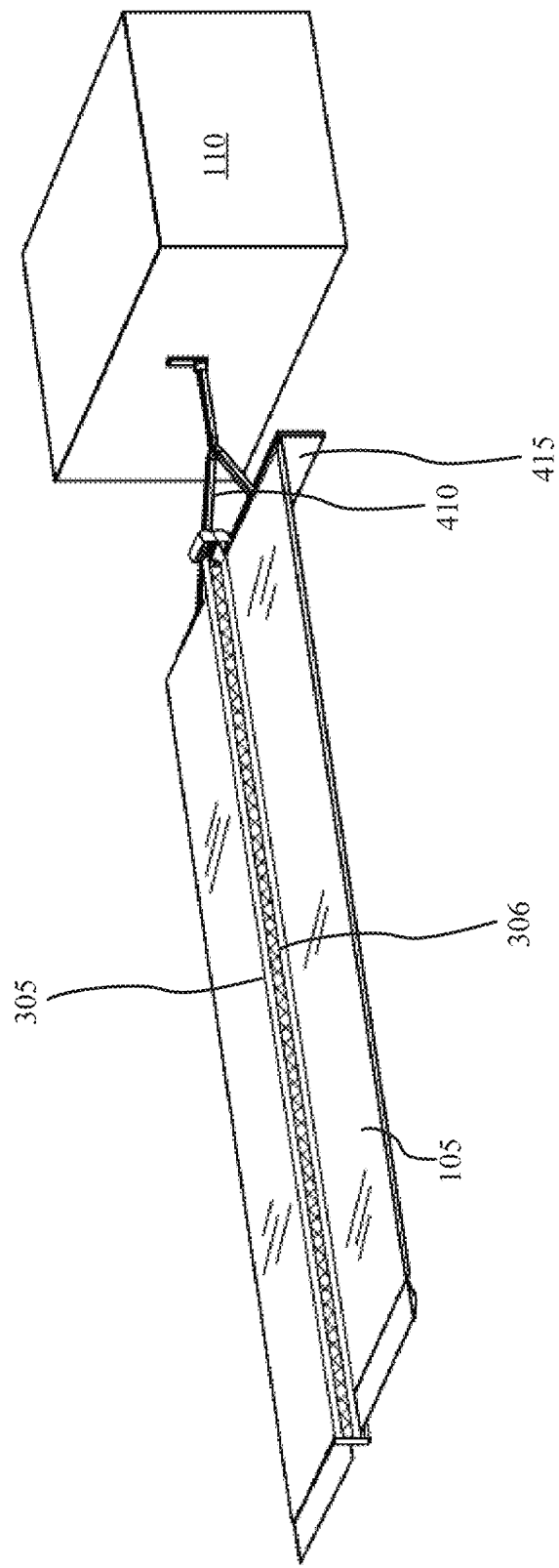
FIG. 8 illustrates a mast in an out of plane configuration relative to the solar blanket 105 according to some embodiments described herein.

FIG. 8 illustrates the mast 600 in an out of plane configuration relative to the solar blanket 105 according to some embodiments described herein. The solar blanket 105 may be stored within a solar blanket housing 415. The housing 310, the housing 311, and the housing 415 may be coupled with the satellite 110 with a yoke structure 410. As shown in the figure, the mast 300 is positioned out of plane relative with the solar blanket 105.

In some embodiments, the mast 600 may be disposed in an in-plane deployed configuration with two solar blankets 105A and 105B according to some embodiments described herein.

Figures 9A, 9B:
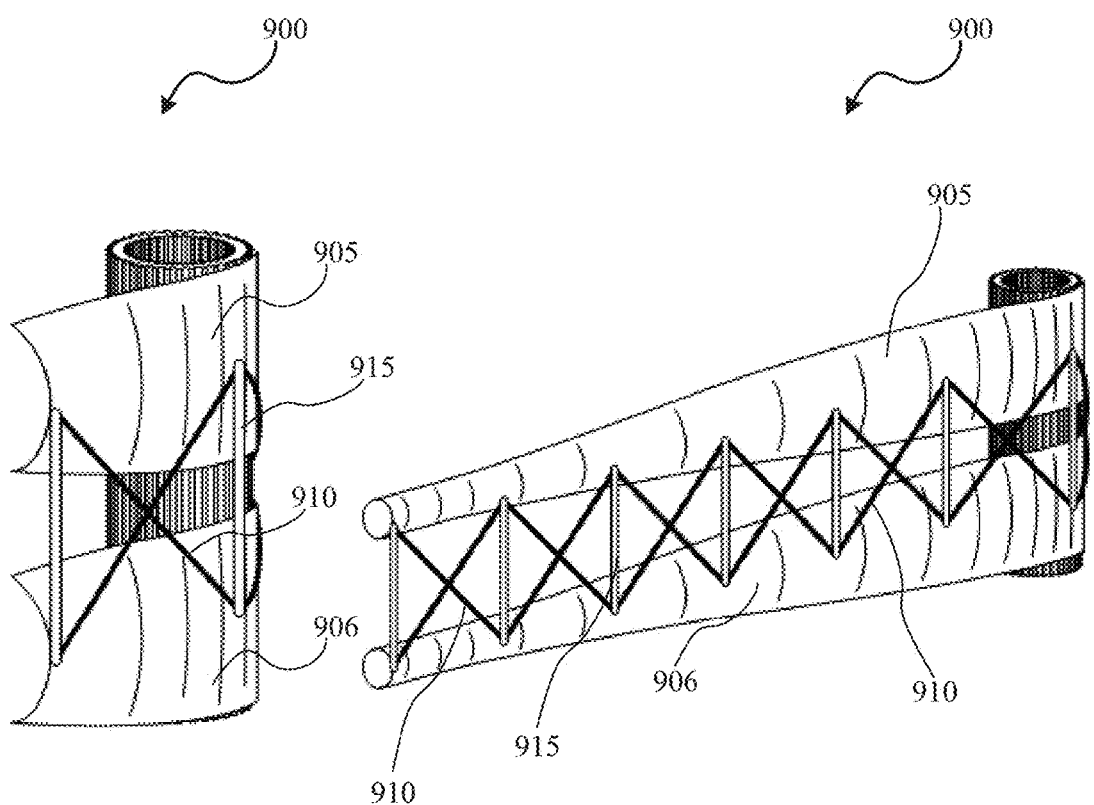
FIG. 9A illustrates a dual boom in a stowed configuration according to some embodiments described herein.
FIG. 9B illustrates a dual boom mast in a partially deployed configuration according to some embodiments described herein.

FIG. 9A illustrates a dual boom mast 900 in a stowed configuration according to some embodiments described herein. The mast may include boom 905 and boom 906. Each of the booms 905 and 906 may include a slit tube longeron. In the stowed configuration the booms 905 and 906 are flattened along their lateral axis and rolled along their longitudinal axis. The boom 905 and the boom 906 are disposed such that the slit along the length of each boom 905 and 906 are facing in the same direction as shown in FIG. 9A. In some embodiments, in the stowed configuration, the boom 905 and the boom 906 can be rolled or disposed on the same spindle.

Figure 9C:
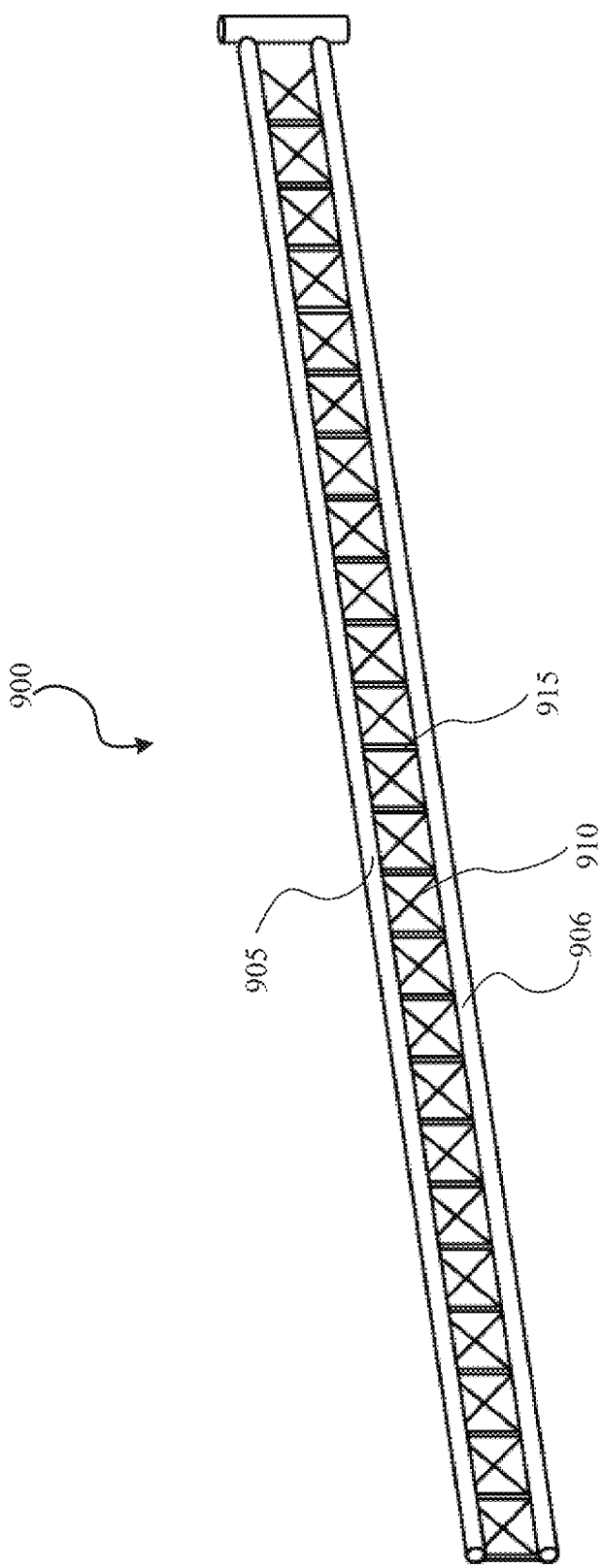
FIG. 9C illustrates a dual boom mast in a deployed configuration according to some embodiments described herein.

FIG. 9B illustrates the dual boom mast 900 in a partially deployed configuration according to some embodiments described herein. FIG. 9C illustrates a dual boom mast 900 in a deployed configuration according to some embodiments described herein.

As shown in FIG. 9A, FIG. 9B and FIG. 9C the boom 905 and the boom 906 may be coupled together with one or more shear ties 910, battens 915, or some combination thereof. The one or more shear ties 910, for example, may be disposed diagonally relative to the boom 905 and/or the boom 906. The one or more shear ties 910, as another example, may be disposed diagonally relative to the battens 915. In some embodiments, the battens 915 may include rigid members that are arranged roughly perpendicular relative to the boom 905 and/or the boom 906. In some embodiments, the battens 915 may include rigid members may be arranged at a diagonal relative to the boom 905 and/or the boom 906. The battens 915 and/or the one or more shear ties 910 may be coupled with the boom 905 and the boom 906 in the deployed configuration shown in FIG. 9C, the partially deployed configuration as shown in FIG. 9B, and the stowed configuration as shown in FIG. 9A.

The battens 915 may include rigid members may, for example, be constructed from composite or metallic materials. The battens 915 may have a rectangular, curved, or channel shaped cross-section.

Figure 10:
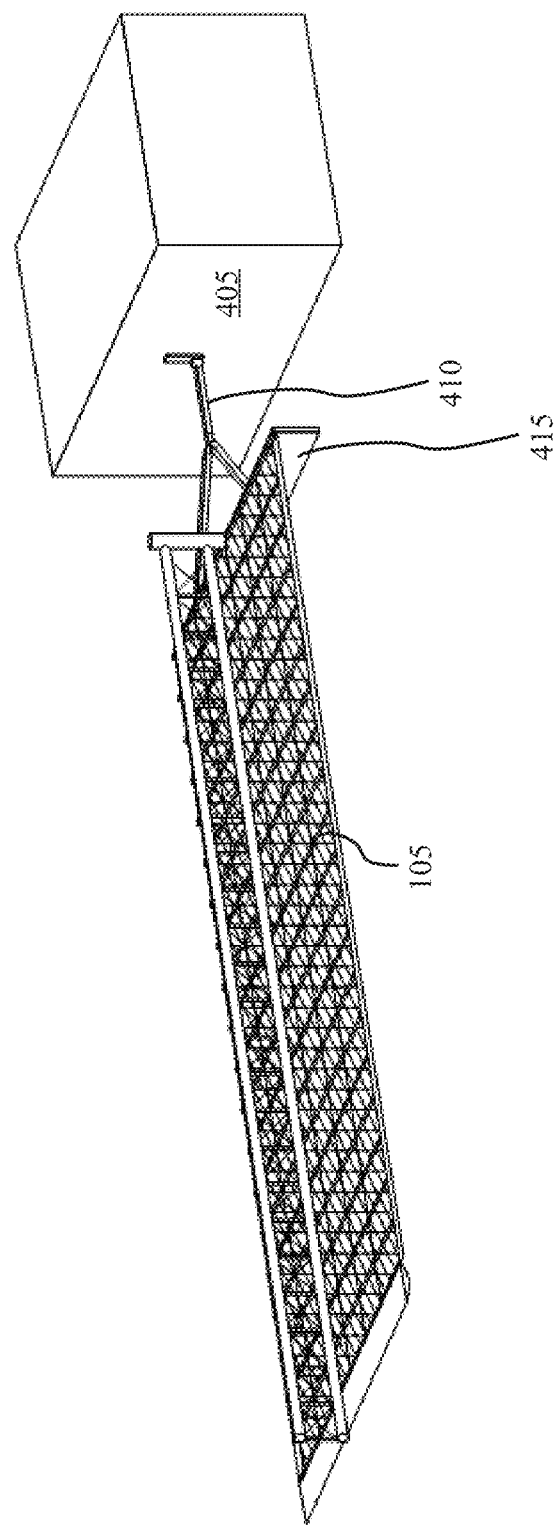
FIG. 10 illustrates a mast coupled with a solar blanket in an out of plane configuration according to some embodiments described herein

FIG. 10 illustrates the dual boom masts 900 coupled with a solar blanket 105 in an out of plane configuration according to some embodiments described herein. In some embodiments, the dual boom masts 900 may be coupled with the solar blanket in an in-plane configuration.

Figure 11:
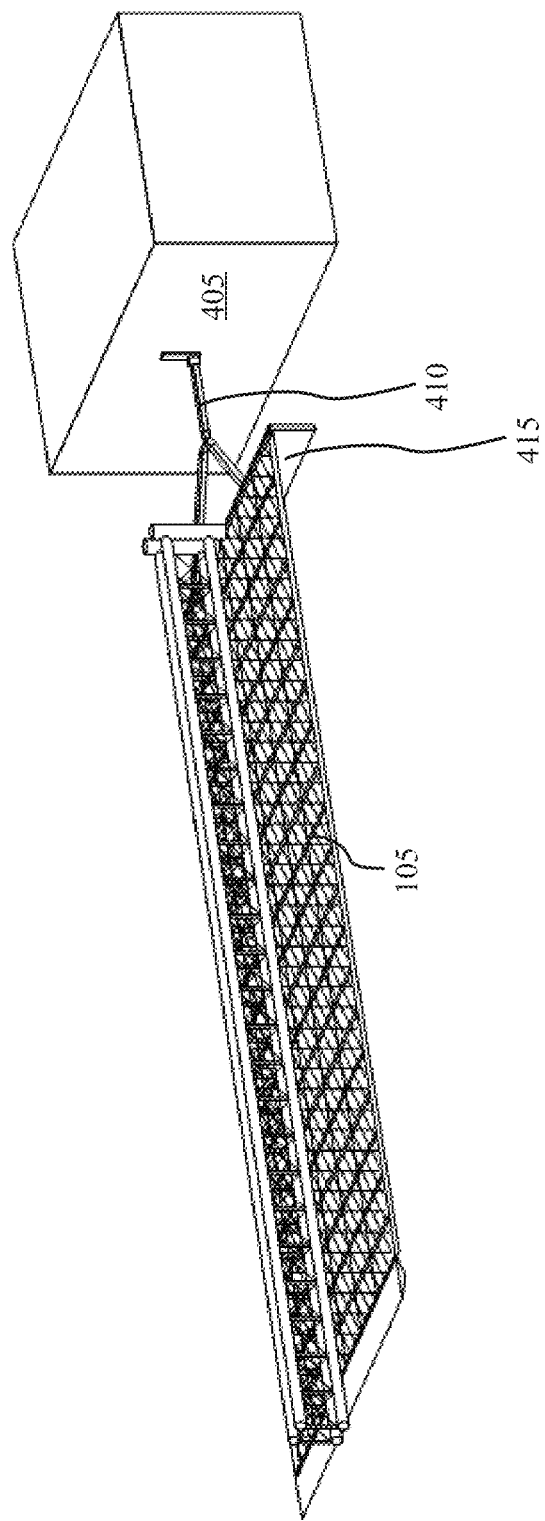
FIG. 11 illustrates a four boom mast coupled with a solar blanket according to some embodiments described herein.

FIG. 11 illustrates a four boom mast coupled with a solar blanket according to some embodiments described herein. In some embodiments, the four boom mast may include two dual boom masts 900. The four booms may be coupled with each other according to various embodiments described herein such as, for example, using one or more shear ties.

The terms "substantially" and "about" indicate a tolerance of plus or minus 10% of the indicated value.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A mast comprising:
   a first slit tube longeron having, in a deployed configuration, a first longitudinal axis and a first slit that extends along a length of the first longitudinal axis from a proximate end to a distal end of the first slit tube longeron, the first slit tube longeron, in a stowed configuration, is flattened and rolled around a first spindle having a first spindle axis;
   a second slit tube longeron having, in the deployed configuration, a second longitudinal axis and a second slit that extends along a length of the second longitudinal axis from a proximate end to a distal end of the second slit tube longeron, the second slit tube longeron, in the stowed configuration, is flattened and rolled around a second spindle having a second spindle axis, the first spindle and the second spindle are separate and distinct spindles, and the first spindle axis and the second spindle axis are offset relative to each other;
   a rigid attachment mechanism that couples the distal end of the first slit tube longeron with the distal end of the second slit tube longeron;
   one or more shear ties coupled with a plurality of locations on the first slat tribe longeron and coupled with a plurality of locations on the second slit tube;
   wherein in the stowed configuration the second tube longeron is flattened and rolled along the second longitudinal axis; and
   wherein in the deployed configuration the first slit tube longeron is extended along the first longitudinal axis and the second slit tube longeron is extended along the second longitudinal axis; and
   wherein the first longitudinal axis and the second longitudinal axis are substantially parallel in the deployed configuration.

2. The mast according to claim 1, wherein the first slit tube longeron and the second slit tube longeron are disposed relative to each other such that the first slit and the second slit are facing.

3. The mast according to claim 1, wherein the first slit tube longeron and the second slit tube longeron are disposed relative to each other such that the first slit and the second slit face away from each other.

4. The mast according to claim 1, wherein the first slit tube longeron and the second slit tube longeron are disposed relative to each other such that the first slit and the second slit face the same direction.

5. The mast according to claim 1, further comprising a plurality of rigid battens, each batten of the plurality of rigid battens is coupled with both the first slit tube longeron and the second slit tube longeron.

6. A mast comprising:
   a first slit tube longeron having, in a deployed configuration, a first longitudinal axis and a first slit that extends along a length of the first longitudinal axis from a proximate end to a distal end of the first slit tube longeron;

a second slit tube longeron having, in the deployed configuration, a second longitudinal axis and a second slit that extends along a length of the second longitudinal axis from a proximate end to a distal end of the second slit tube longeron, wherein in the deployed configuration the slit of the second slit tube longeron faces away relative to the first slit tube longeron and the slit of the first slit tube longeron faces away relative to the second slit tube longeron;

a rigid attachment mechanism that couples the distal end of the first slit tube longeron with the distal end of the second slit tube longeron; and one or more shear ties coupled with a plurality of locations on the first slit tube longeron and coupled with a plurality of locations on the second slit tube;

wherein in a stowed configuration the first slit tube longeron is flattened and rolled along the first longitudinal axis around a first spindle having a first spindle axis;

wherein in the stowed configuration the second slit tube longeron is flattened and rolled along the second longitudinal axis around a second spindle having a second spindle axis, the first spindle and the second spindle are separate and distinct spindles, and the first spindle axis and the second spindle axis are offset relative to each other;

wherein in the deployed configuration the first slit tube longeron is extended along the first longitudinal axis and the second slit tube longeron is extended along the second longitudinal axis;

and wherein the first longitudinal axis and the second longitudinal axis are substantially parallel.

7. A mast comprising:

a first slit tube longeron having, in a deployed configuration, a first longitudinal axis and a first slit that extends along a length of the first longitudinal axis from a proximate end to a distal end of the first slit tube longeron, wherein the proximal end of the first slit tube longeron is coupled with a first spindle;

a second slit tube longeron having, in the deployed configuration, a second longitudinal axis and a second slit that extends along a length of the second longitudinal axis from a proximate end to a distal end of the second slit tube longeron, wherein the proximal end of the second slit tube longeron is coupled with a second spindle;

a rigid attachment mechanism that couples the distal end of the first slit tube longeron with distal end of the second slit tube longeron;

one or more shear ties coupled with a plurality of locations on the first slit tube longeron and coupled with a plurality of locations on the second slit tube;

wherein in a stowed configuration the first slit tube longeron is flattened and rolled along the first longitudinal axis around the first spindle;

wherein in the stowed configuration the second slit tube longeron is flattened and rolled along the second longitudinal axis around the second spindle, wherein the first spindle and the second spindle are separate and distinct, and the first spindle and the second spindle are offset relative to each other; and wherein in the deployed configuration the first slit tube longeron is extended along the first longitudinal axis and the second slit tube longeron is extended along the second longitudinal axis;

wherein the first slit tube longeron and the second slit tube longeron are separate and distinct; and wherein the first longitudinal axis and the second longitudinal axis are substantially parallel.

* * * * *